United States Patent [19]

Iapalucci et al.

[11] Patent Number: 5,732,130
[45] Date of Patent: Mar. 24, 1998

[54] SYSTEM AND METHOD OF PROVIDING ENHANCED SUBSCRIBER SERVICES IN A MULTI-NODE TELECOMMUNICATIONS NETWORK

[75] Inventors: Michael Q. Iapalucci, Carrollton, Tex.; Robert I. Shepard, Lakewood, Colo.

[73] Assignee: Ericsson Inc., Research Triangle Park, N.C.

[21] Appl. No.: 709,527

[22] Filed: Sep. 6, 1996

Related U.S. Application Data

[63] Continuation of Ser. No. 330,313, Oct. 27, 1994, abandoned.
[51] Int. Cl.$^6$ ........................................ H04M 3/42
[52] U.S. Cl. ................. 379/207; 379/88; 379/201; 379/230
[58] Field of Search ..................... 379/67, 88, 89, 379/201, 207, 211, 212, 230, 235, 242, 243, 244, 245, 246

[56] References Cited

U.S. PATENT DOCUMENTS

| | | | |
|---|---|---|---|
| 4,611,096 | 9/1986 | Asmuth et al. | 379/207 |
| 4,878,240 | 10/1989 | Lin et al. | 379/67 |
| 5,163,080 | 11/1992 | Amoroso et al. | 379/207 X |
| 5,208,848 | 5/1993 | Pula | 379/67 |
| 5,241,588 | 8/1993 | Babson, III et al. | 379/201 |
| 5,251,255 | 10/1993 | Epley | 379/242 |
| 5,259,026 | 11/1993 | Johnson | 379/207 |
| 5,282,244 | 1/1994 | Fuller et al. | 379/230 |
| 5,293,376 | 3/1994 | White | 370/54 |
| 5,377,186 | 12/1994 | Wegner et al. | 379/207 X |
| 5,425,091 | 6/1995 | Josephs | 379/201 |
| 5,436,957 | 7/1995 | McConnell | 379/88 |
| 5,467,388 | 11/1995 | Redd, Jr. et al. | 379/207 X |
| 5,519,770 | 5/1996 | Stein | 379/201 |
| 5,572,583 | 11/1996 | Wheeler, Jr. et al. | 379/207 |

FOREIGN PATENT DOCUMENTS 59-023693  2/1984  Japan.

OTHER PUBLICATIONS

Surinder K. Jain, *Intelligent Peripheral: Signaling and Protocols*, Oct. 25, 1992, pp. 117–121.
Matthew Ryan, Richard Dreher and Ulf Sidemo, *Intelligent Peripherals—"The Required Component"*, 1992/1993, pp. 644–649.
Thomas R. Mueller, Thomas P. Bicek, Babu Chirayil, *Interaction of the ISUP Supplementary Services wth the Intelligent Network*, 1993/1993, pp. 605–612.
E.S.P. Allard, N. Day, *Switching of Information Services in the UK Network and Evolution Towards the Intelligent Network*, vol. 1, pp. 119–122.

*Primary Examiner*—Krista M. Zele
*Assistant Examiner*—Scott L. Weaver
*Attorney, Agent, or Firm*—Jenkens & Gilchrist

[57] ABSTRACT

A system and method for providing advanced voice services to subscribers of a telecommunications network are disclosed. The system comprises a local switch connected to the telecommunications network for providing two-way communication between the subscribers and the network. A database of subscriber services, which may be a virtual service switching point (ViSSP), is connected to the local switch, and an intelligent peripheral (IP) is connected to the database and the local switch. The IP processes voice information and dual tone multi-frequency (DTMF) digits received from the switch in response to instructions from the database. The system retrieves subscriber services from the database utilizing a call-setup protocol such as the Integrated Services Digital Network (ISDN) User Part (ISUP) call setup protocol, and provides the services to the switch. The system also retrieves the processed voice information and DTMF digits from the IP and provides the processed information and digits to the switch.

15 Claims, 8 Drawing Sheets

— VOICE PATH
---- SIGNAL PATH

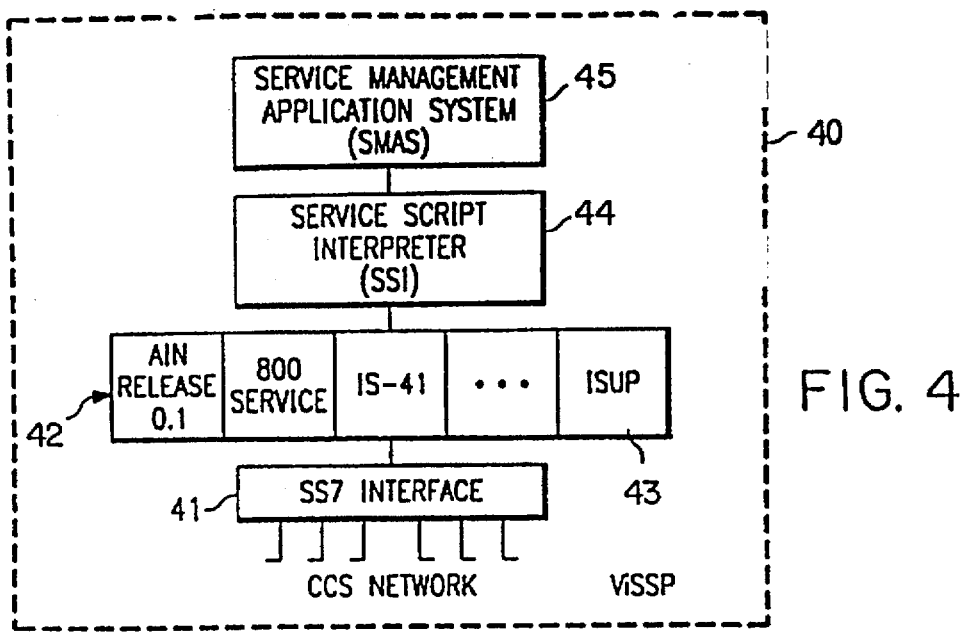

FIG. 4

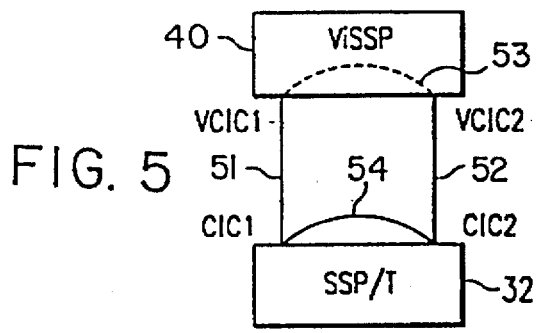

FIG. 5

| IAM and IAM (Call-Forward) Parameters | SSI Tag |
|---|---|
| Nature of connection indicators | NCI Tag (new) |
| Forward call indicators | FCI Tag (new) |
| Calling party's category | ACAT Tag |
| User service information | USI Tag (new) |
| Called party number | BNR Tag |
| Calling party number | ANR Tag |
| Charge number | BN Tag |
| Originating line information | OST Tag |
| Transit network selection | TNS Tag (new) |
| Carrier selection | First Word of CID Tag |
| Service code indicator | SCI Tag (new) |
| Redirection information | RDIRINF Tag |
| Original called party | ORIGBNR Tag |
| Redirecting number | RDIRNR Tag |

FIG. 6

SYSTEM AND METHOD OF PROVIDING ENHANCED SUBSCRIBER SERVICES IN A MULTI-NODE TELECOMMUNICATIONS NETWORK

This application is a continuation of application Ser. No. 08/330,313, filed on Oct. 27, 1994, which was abandoned upon the filing hereof.

BACKGROUND OF THE INVENTION

1. Technical Field of the Invention

This invention relates to telecommunication networks, and more particularly, to a system and method of providing enhanced subscriber services utilizing an intelligent peripheral.

2. Description of Related Art

It is desirable in modern telecommunication systems to provide subscribers with enhanced services in order to increase the value of the telephone service offered. The value is increased to the subscribers due to increased uses for their phones, greater ease of use, and/or greater flexibility in the use of their phones. The value is increased to the operators of telecommunication systems due to increased revenues from the sale and use of the enhanced services. Such enhanced subscriber services may include voice activated dialing, E-mail access, and conferencing multiple calls.

Using existing network architectures, providing some enhanced services universally may require expensive software or hardware upgrades to many switches in the network. On an individual basis, a subscriber may be able to obtain a desired service by changing to a switch that is capable of providing the desired service. However, this alternative may require changing the subscriber's phone number.

Although there are no known prior art teachings of a solution to the aforementioned deficiency and shortcoming such as that disclosed herein, a number of prior art references exist that discuss subject matter that bears some relation to matters discussed herein. Such prior art references are U.S. Pat. Nos. 4,878,240, 5,208,848, and 5,259,026. Each of these references is discussed briefly below.

U.S. Pat. No. 4,878,240 to Lin et al. discloses a multi-service telephone switching system that contains a programmable adjunct connected to an existing telephone switch. The adjunct is a separate entity from the switch, and subscribers must be connected to the existing switch. The intelligent peripherals of the present invention, on the other hand, may be connected to a service node which is implemented as an overlay to a telecommunications network, thereby enabling subscribers to be connected directly to the service node. Additionally, the IP of the present invention may be connected to a virtual service switching point (ViSSP) which provides the service logic and contains the subscriber data needed to provide advanced subscriber services.

U.S. Pat. No. 5,208,848 to Pula discloses an intelligent peripheral (IP) which performs such functions as voice messaging and speech recognition for interpreting customer requests and supplying the digits needed to implement those requests. The customer is connected in parallel to a dialing receiver and to the IP. When a critical condition is detected, the IP signals the switch and substitutes digits for those received from the customer. Pula thus bridges the IP into a call in parallel with a switch, and either the IP or the switch can control the call. Additionally, the switch collects information for the IP.

Pula, however, does not teach or suggest an intelligent peripheral which is routed via a network address (called number) and which performs all its functions in conjunction with a virtual service switching point (ViSSP). In the present invention, a controlling network entity (the ViSSP) provides the service logic and contains the subscriber data needed to provide advanced subscriber services.

U.S. Pat. No. 5,259,026 to Johnson discloses a method of updating a network database, particularly, a speed-calling database to eliminate non-working numbers. Johnson includes an intelligent peripheral (IP) in an Advanced intelligent Network (AIN) for use with a Service Control Point (SCP) or adjunct system to provide voice announcements. As noted in column 4, lines 38–43; col. 7, lines 13–16, 42–50, and 56–59; and col. 9, lines 29–37, the IP performs only the function of playing announcements to a subscriber; it does not perform such functions as translating voice to digits as required for implementing voice activated dialing or other advanced services.

Review of each of the foregoing references reveals no disclosure or suggestion of a system or method such as that described and claimed herein.

SUMMARY OF THE INVENTION

In one aspect, the present invention is a system for providing advanced voice services to subscribers of a telecommunications network. The system comprises a local switch connected to the telecommunications network and providing two-way communication between the subscribers and the network. A database of subscriber services is connected to the local switch, and an intelligent peripheral is connected to the database and the local switch. The intelligent peripheral processes voice information and dual tone multi-frequency digits received from the switch in response to instructions from the database. The system also includes means for retrieving subscriber services from the database utilizing a call-setup protocol, and providing the services to the switch, as well as means for retrieving the processed voice information and dual tone multi-frequency digits from the intelligent peripheral and providing the processed information and digits to the switch.

In another aspect, the present invention is a method of providing advanced voice services to subscribers of a telecommunications network. The method comprising the steps of connecting a local switch to the telecommunications network for providing two-way communication between the subscribers and the network. A database of subscriber services is then connected to the local switch. This step is followed by connecting an intelligent peripheral to the database and the local switch, with the intelligent peripheral processing voice information and dual tone multi-frequency digits received from the switch in response to instructions from the database. Next, subscriber services are retrieved from the database utilizing a call-setup protocol, and the services are provided to the switch. This step is followed by retrieving the processed voice information and dual tone multi-frequency digits from the intelligent peripheral, and providing the processed information and digits to the switch.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 4 is a simplified functional block diagram of a portion of the architecture of a ViSSP within an AIN;

FIG. 5 is a block diagram showing the signaling links and looped circuits between the ViSSP and the service switching point/tandem (SSP/T) in the preferred embodiment of the present invention;

FIG. 6 illustrates representative parameters of an integrated Services Digital Network (ISDN) User Part (ISUP) initial address message (IAM) and an IAM (Call-Forward) message and their associated SSI tags;

DETAILED DESCRIPTION OF EMBODIMENTS

The present invention is an intelligent peripheral (IP) for a node in a telecommunication network which may be implemented in several alternative embodiments. The preferred embodiment, as described herein, is to connect the IP into an Advanced intelligent Network (AIN) equipped with a Virtual Service Switching Point (ViSSP). In an alternative embodiment, the IP is connected into an AIN equipped with a Service Control Point (SCP).

Figure 1:
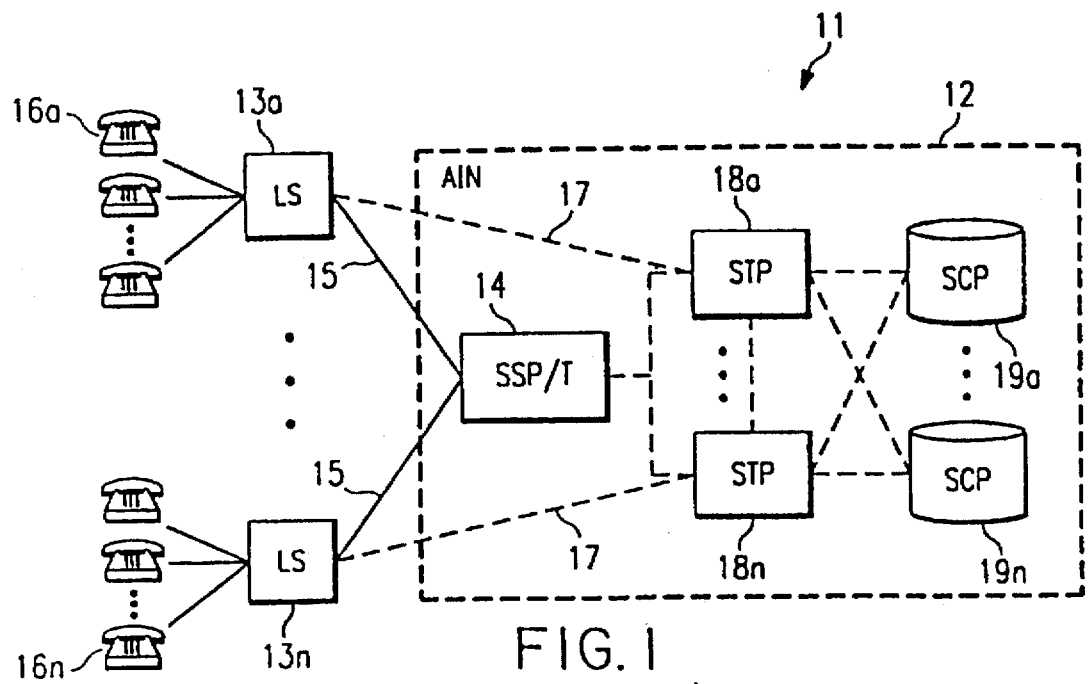
FIG. 1 (Prior Art) is a simplified block diagram of a typical telecommunications system using an Advanced Intelligent Network (AIN) to provide enhanced subscriber services.

FIG. 1 is a simplified block diagram of a typical telecommunications system 11 using an Advanced Intelligent Network (AIN) 12 to provide enhanced subscriber services. A large number of Local Switches (LSs) 13a–n may be connected for call processing to a Service Switching Point/Tandem (SSP/T) 14 via voice trunks 15. The LSs 13a–n provide connections for subscribers 16a–n into the telecommunications system 11. The AIN 12 uses a system of high speed telecommunications links known as a Common Channel Signaling (CCS) network which employs a standard signaling protocol known as Signaling System Number 7 (SS7) to link all of the components of the AIN 12. The AIN 12 and its associated SS7 protocol are described in the industry standard, "TR-NWT-000246, Bell Communications Research Specification of Signaling System Number 7," which is hereby incorporated by reference herein.

The components of the AIN 12 may include the SSP/T 14, one or more Signal Transfer Points (STPs) 18a–n which act as intermediate switching nodes, and one or more Service Control Points (SCPs) 19a–n. Each SCP 19 contains a database of enhanced subscriber services which may be accessed and controlled by a Service Logic Program (SLP) and a Service Script interpreter (SSI) database program. The SCP 19 acts as a repository for enhanced subscriber services which may be accessed by any one of the LSs 13a–n which have been upgraded to communicate with a standardized Transaction Capability Application Part/Advanced Intelligent Network (TCAP/AIN) communications protocol. The SCP 19 performs service activation functions which include database storage of enhanced subscriber services, and retrieval of services through the use of software modules known as Service independent Building Blocks (SIBs). Service Script interpreter (SSI) software is utilized to combine various SIBs into service scripts which define and implement enhanced subscriber services. The SCP 19 is described in the Bellcore standard, "TA-NWT-001280, Advanced Intelligent Network (AIN) Service Control Point (SCP) Generic Requirements," which is hereby incorporated by reference herein. The current interface requirements for the SCP 19 are described in the Bellcore standard, "TR-NWT-001285 Advanced intelligent Network (AIN) 0.1 Switch-Service Control Point (SCP) Application Protocol Interfaces Generic Requirements," which is hereby incorporated by reference herein.

Still referring to FIG. 1, it can be seen that LSs 13a–n may access the AIN 12 either through MF trunks 15 and the SSP/T 14, or directly through SS7 links 17 to the STP 18. The flow of messages involved in determining the type of access, and in the method of service retrieval from the database in the SCPs 19, is shown in the flow diagram of FIG. 2. At step 21, a calling subscriber 16a (FIG. 1) dials the telephone number of a called subscriber 16n. At 22, it is determined whether or not the originating LS 13a has been upgraded to utilize the SS7 signaling protocol. If not, then the LS cannot directly access the AIN 12, and the signal is routed, at step 23, to the associated telephone Service Switching Point/Tandem (SSP/T) 14 via a low speed MF trunk 15. At step 24, AIN service is invoked in the SSP/T 14 which recognizes the dialed number as an AIN subscriber at 25. At step 26, the SSP/T 14 sends a Query message via the STP 18 to the SCP 19 requesting call processing instructions. The SCP performs a database lookup on the called subscriber's service that is being invoked at step 27, and then returns routing instructions to the SSP/T 14 at step 28. This response contains all of the information that is necessary to route the call (i.e., routing number, carrier, billing number, etc.). The SSP/T 14 receives the routing instructions from the SCP 19, and completes the call at step 29 by setting a MF trunk 15 between the calling subscriber 16a and the called subscriber 16n.

if, however, at step 22 it is determined that the LS is SS7-capable, then the message flow moves to step 31 where it is determined whether or not the LS has been upgraded with the latest release of the TCAP/AIN communications protocol. If not, then the flow again moves to step 23 where the signal is routed to the associated SSP/T 14 via MF trunk 15. Steps 24 through 29 are then utilized to retrieve the enhanced subscriber service.

if, at step 31, it is determined that the LS has been upgraded with the latest release of the TCAP/AIN communications protocol, then the LS may directly access the AIN 12. At step 32, AIN service is invoked in the LS which recognizes the dialed number as an AIN subscriber at 33. At step 34, the LS sends a Query message via the STP 18 to the SCP 19 requesting call processing instructions. The SCP performs a database lookup on the called subscriber's service that is being invoked at step 35, and then returns routing instructions to the LS 13 at step 36. This response contains all of the information that is necessary to route the call (i.e., routing number, carrier, billing number, etc.). The LS 13 receives the routing instructions from the SCP 19, and completes the call at step 37 by setting a MF trunk 15 between the calling subscriber 16a and the called subscriber 16n.

Connection to a Virtual Service Switching Point (ViSSP)

Figure 3:
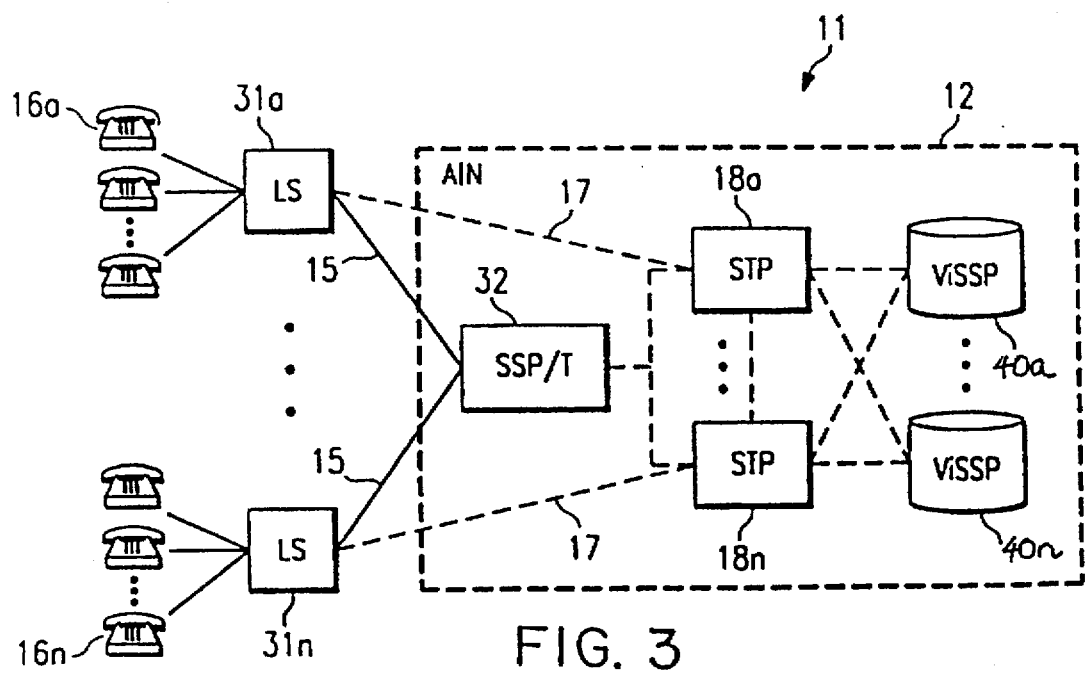
FIG. 3 is a simplified block diagram of the preferred embodiment of a telecommunications system using an AIN to provide enhanced subscriber services, and which is equipped with Virtual Service Switching Points (ViSSPs) in accordance with the teachings of the present invention.

FIG. 3 is a simplified block diagram of the preferred embodiment of a telecommunications system using an AIN to provide enhanced subscriber services, and which is equipped with Virtual Service Switching Points (ViSSPs) 40a–40n in accordance with the teachings of the present invention. The ViSSP 40 is a system which, like a SCP 19, provides a database of enhanced subscriber services which may be accessed by LSs utilizing the high speed CCS network; however, the ViSSP does not require the expensive upgrading of LSs to operate with the TCAP/AIN communications protocol because services are retrieved utilizing the ISUP call setup protocol. A complete description of the ViSSP 40 is found in co-pending, recently allowed U.S. patent application Ser. No. 08/095,300 entitled, "System for Providing Enhanced Subscriber Services Using ISUP Call-Setup Protocol," now U.S. Pat. No. 5,377,186 which is hereby incorporated by reference herein.

FIG. 4 is a simplified block diagram of a portion of the architecture of a virtual service switching point (ViSSP) 40 within an AIN 12. In the preferred embodiment of the present invention, the intelligent peripheral (IP) is connected into an AIN equipped with a ViSSP 40. Before continuing with the description of the IP and the connection thereof into the AIN 12, a brief description of the ViSSP is provided.

The ViSSP 40 includes an interface for the SS7 signaling protocol 41, TCAP protocol translators 42 including a newly added ISUP protocol translator 43, a modified Service Script Interpreter (SSI) 44, and a modified Service Management Application System (SMAS) operating system 45. The modifications to the ViSSP 40 result in the ViSSP performing AIN-type services (e.g., number translation) using parameters in the ISUP call-setup protocol that were originally intended for conditions such as call forwarding. This alternative use of the ISUP call-setup protocol allows the introduction of new services in a multi-vendor network using existing technology already in place.

Signals from the CCS high-speed network enter the ViSSP 40 through the SS7 interface 41. Then, since several different signaling protocols are used in the CCS network to request different subscriber services, the ViSSP 40, like the SCP 19, includes TCAP protocol translators 42 for communication with the modified SSI database program 44.

An ISUP interface is added to the architecture of the SCP 19, in order to create the ViSSP 40. The ISUP interface may comprise an ISUP protocol translator 43 which is added to the TCAP protocol translators 42, as well as a modified SSI 44 and a modified SMAS 45. The implementation of these modifications enables LSs to utilize the ISUP call-setup protocol to direct the SSI database program 44 to access many of the enhanced subscriber services stored within the ViSSP 40.

FIG. 5 is a block diagram showing the signaling links 51 and 52 and looped circuits 53 and 54 between the ViSSP 40 and the SSP/T 32 (FIG. 3) in the preferred embodiment of the present invention. When the ViSSP 40 first receives an ISUP message, a software mapping unit within the ISUP protocol translator 43 (FIG. 4) verifies that the message includes a Circuit Identification Code (CIC) which belongs to a defined "virtual" voice circuit pair. A virtual voice circuit pair, illustrated as VCIC1 and VCIC2 in FIG. 5, comprises two voice circuits (CIC1 and CIC2) that are physically linked by a looped voice circuit 53 in the originating SSP/T 32. The ISUP protocol translator 43 maintains a mapping of these pairs through a looped virtual voice circuit 54 so that an ISUP message can be returned to the originating switch with the related CIC for the pair. If the CIC does not belong to a virtual voice circuit pair, then the ISUP protocol translator 43 sends the ISUP message, "Unequipped Circuit identification Code (UCIC) back to the originating switch.

After receiving the message and verifying the CIC, the ISUP protocol translator 43 changes the CIC in the message to the related CIC of the virtual voice circuit pair. Additionally, an Originating Point Code (OPC) and a Destination Point Code (DPC) are swapped. The ISUP protocol translator 43 then checks the message type. If the message type indicates an ISUP Initial Address Message (IAM), the software mapping unit within the protocol translator 43 maps it into a Query message to the SSI 44. The IAM message parameters are translated into "SSI message tags".

FIG. 6 illustrates representative parameters of an ISUP IAM message and an IAM (Call-Forward) message and their associated SSI tags. The IAM parameters may vary from time to time as new industry standards are promulgated, but the basic implementation of the present invention does not change. FIG. 6 identifies those tags which are newly created tags enabling use of the IAM format with the ViSSP 40.

The ISUP protocol translator 43 seizes the interface to the SSI 44, and sends the tags to the SSI using a simple query and response access. The SSI database program is modified to recognize the newly created tags. To the SSI software, the IAM appears to be an AIN Release 0.1 Info__Analyzed message requesting retrieval of a subscriber service. The ViSSP's Service Logic Program within the SSI 44 processes the IAM query and returns the tags (possibly modified by the SSI service logic) to the ISUP protocol translator 43. The ISUP protocol translator includes a new routing number (translated destination) which is loaded into a called-party number included in an IAM (Call-Forward) message. The IAM (Call-Forward) message is an IAM which is sent from the ViSSP 40 back to the originating LS 31a. The IAM (Call-Forward) message directs the originating LS 31a to initiate a new call to the new translated destination. The dialed number from the original IAM is loaded into the original called-party number parameter.

If the ISUP protocol translator 43 checks the received message type and determines that the received message is not an IAM, then the ISUP protocol translator 43 returns the message to the originating switch. Thus, the message is essentially looped back to the related CIC in the virtual circuit pair.

Figure 7:
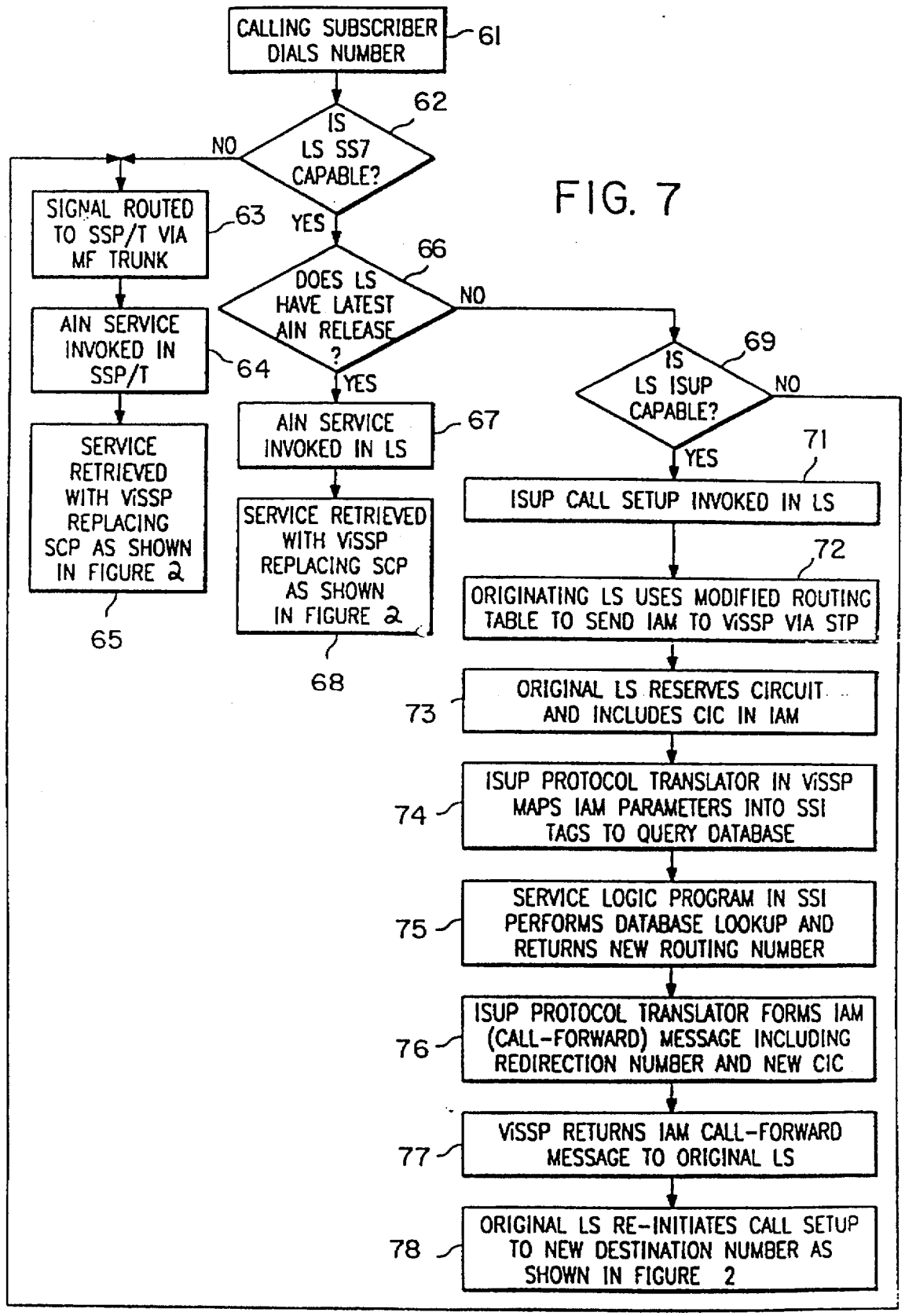
FIG. 7 is a flow chart of a typical message flow utilized in the preferred embodiment of the present invention when a modified local switch (LS) or SSP/T retrieves enhanced subscriber services from a ViSSP.

FIG. 7 is a flow chart of a typical message flow utilized in the preferred embodiment of the present invention when a modified LS 31 (FIG. 3) or SSP/T 32 retrieves enhanced subscriber services from a ViSSP 40. At step 61, a calling subscriber 16a dials the number of a called subscriber 16n. At step 62, it is determined whether or not the originating LS 31a has been modified to utilize the SS7 signaling protocol. If not, then the signal is routed, at 63, to the associated SSP/T 32 via a MF trunk. At 64, AIN service is invoked in the SSP/T 32. At 65, the service is retrieved from the ViSSP 40 utilizing steps 25 through 29 of FIG. 2, with the ViSSP 40 replacing the SCP 19.

If, however, at step 62, it is determined that the originating LS 31a is SS7-capable, then it is determined at 66 whether or not the originating LS 31a has been upgraded with the latest release of the TCAP/AIN communications protocol. If the LS 31a has been upgraded with TCAP/AIN, then AIN service is invoked in the LS 31a at step 67. Thereafter, at step 68, the enhanced subscriber service is retrieved from the ViSSP 40 utilizing steps 33 through 37 of FIG. 2, with the ViSSP 40 replacing the SCP 19.

Figure 2:
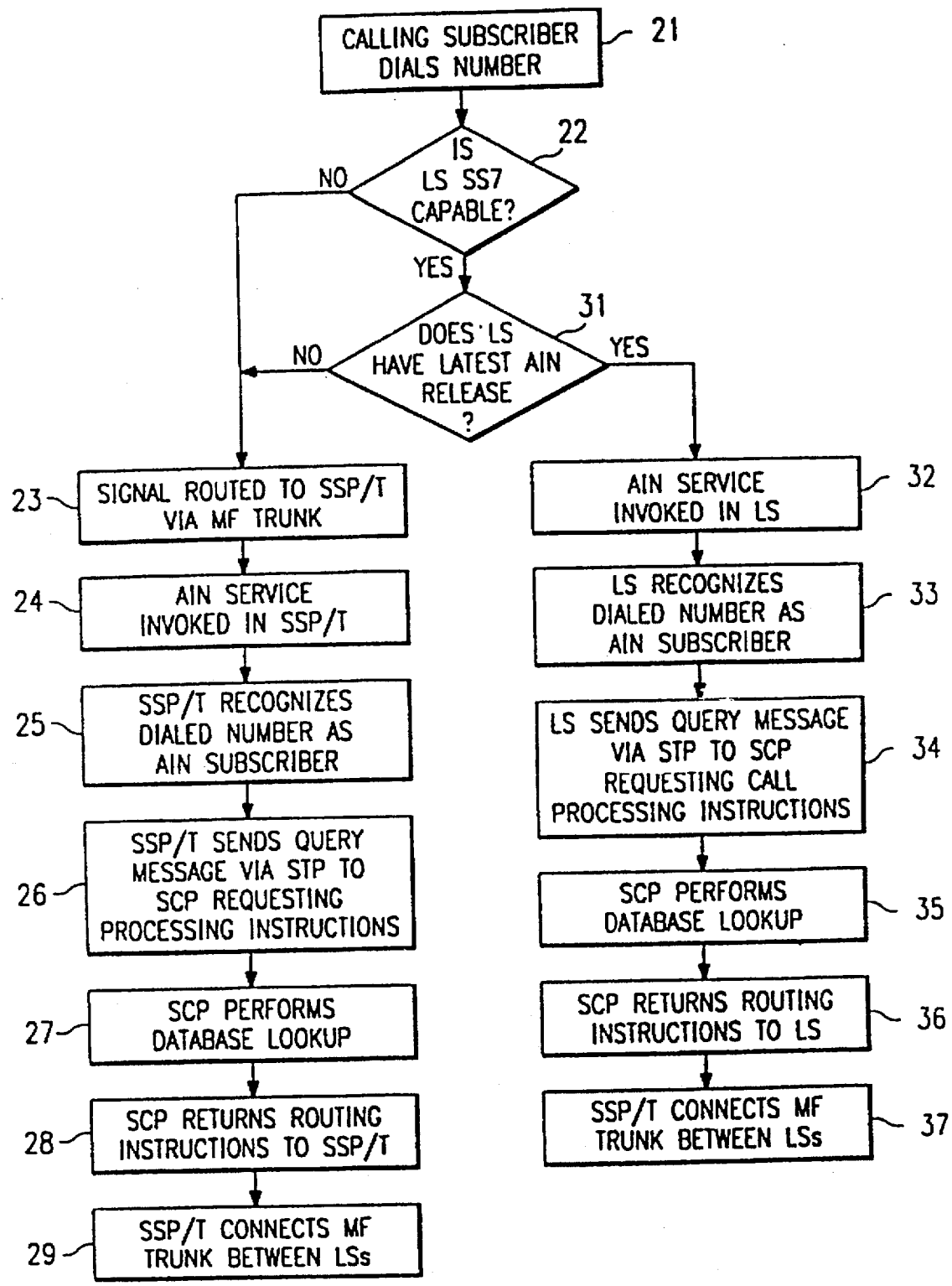
FIG. 2 (Prior Art) is a flow chart illustrating the message flows involved in determining the type of access provided for different LSs, and in the method of service retrieval, from a database stored in a Service Control Point (SCP)

Unlike FIG. 2, however, if it is determined at step 66 that the originating LS 31a is not upgraded with the TCAP/AIN communications protocol, the system of the present invention does not have to revert to routing the signal through a MF trunk to the SSP/T 32. Instead, the message flow moves to step 69 where it is determined whether or not the originating LS 31a has been upgraded to communicate with the ISUP call-setup protocol. Only if the LS 31a has not been upgraded with the ISUP protocol does the system move to step 63 where the signal is routed to the associated SSP/T 32 via a MF trunk.

If, however, the originating LS 31a is one of the many LSs which have been upgraded to communicate utilizing the ISUP call-setup protocol, then the message flow moves to step 71 where ISUP call setup is invoked in the LS 31a. At step 72, the originating LS 31a uses its modified routing table to send an ISUP initial Address Message (IAM) to the ViSSP 40. At 73, the LS 31a reserves a MF circuit on a looped trunk and includes a Circuit identification Code (CIC) in the signaling information field (SIF) along with the IAM. The CIC code that is used by the LS 31a in the initial IAM message identifies a circuit that is looped back into the same LS 31a since the ViSSP 40 does not have any MF circuits.

At 74, the ViSSP 40 receives the IAM, and the ISUP protocol translator 43 maps it into a Query message to the service script interpreter (SSI) 44. The IAM parameters are mapped into SSI tags (FIG. 6) for this purpose. To the SSI software, the IAM appears as an AIN Release 0.1 info__ Analyzed message requesting retrieval of a subscriber service. At 75, the ViSSP's Service Logic Program within the SSI 44 processes the IAM query, performs a database lookup, and returns a new routing number. The dial ed number from the original IAM is loaded into the original called-party number parameter. At 76, the called-party number parameter is included in an IAM (Call-Forward) message which includes a new CIC code in order to prevent a dual seizure of the same circuit that the LS 31a used. The new translated number is loaded into the called-party number parameter. If the new translated number is to be presented, then it is loaded into the Redirection Number and Redirection Information parameters. The ViSSP 40 contains information on the CIC codes used by the LSs so that a valid CIC code is used in the return IAM (Call-Forward) message. The ViSSP returns the IAM to the originating LS 31a at step 77. The originating LS 31a receives the IAM (Call-Forward) message, and, at step 78, re-initiates call setup by sending another IAM message to the new destination number that was contained in the IAM (Call-Forward) message received from the ViSSP 40. Thereafter, with the exception of the release sequence described below in conjunction with FIG. 8, call processing continues as specified in "TR-NWT-000317, Switching System Generic Requirements for Call Control Using the Integrated Services Digital Network User Part (ISDNUP)", "TR-NWT-000394, Switching System Generic Requirements for Interexchange Carrier interconnection Using the Integrated Services Digital Network User Part (ISDNUP)", and "TR-NWT-000444, Switching System Requirements Supporting ISDN Access Using the ISDN User Part", which are hereby incorporated by reference herein.

Figure 8:
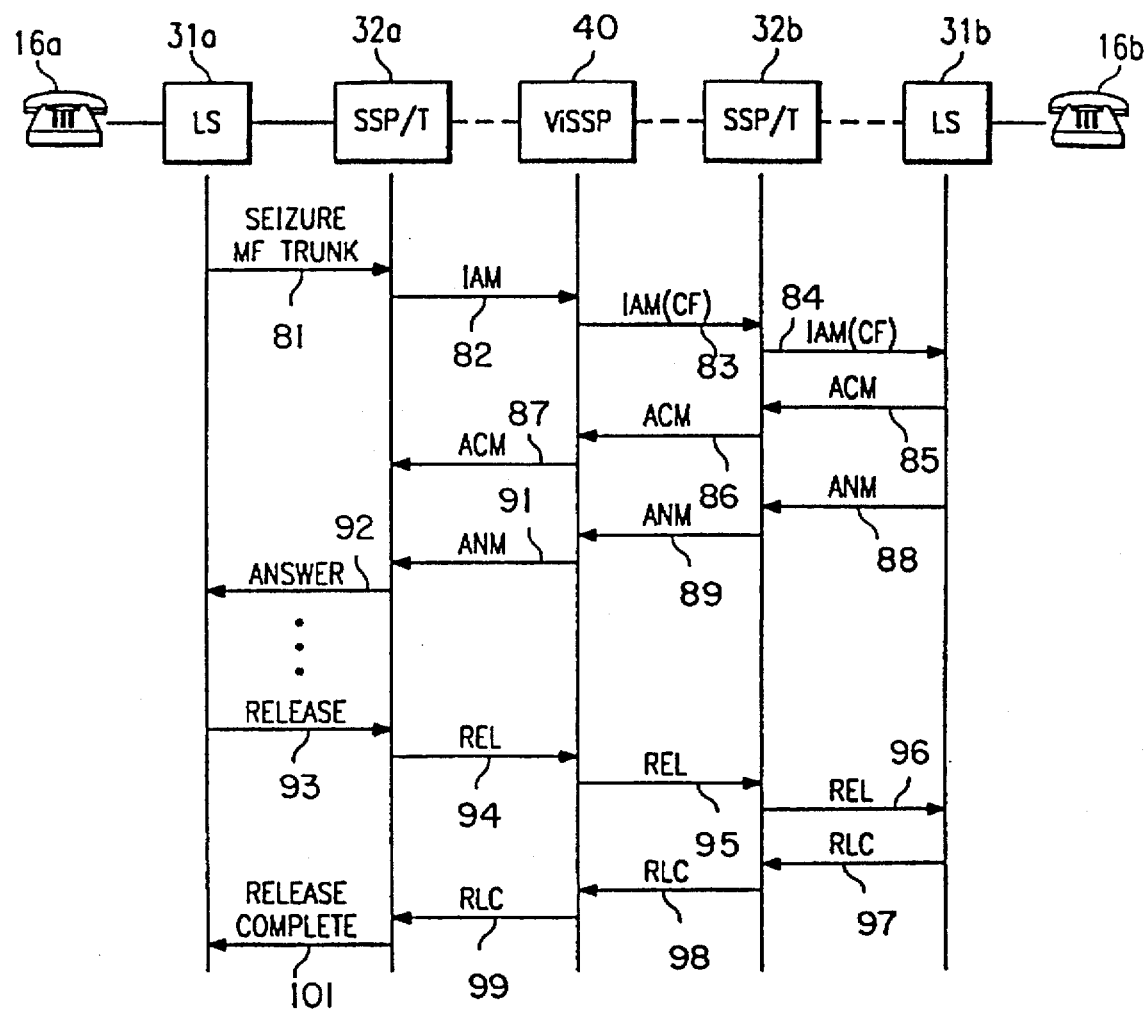
FIG. 8 is a message flow diagram illustrating the flow of messages utilized for the retrieval of an enhanced subscriber service from the ViSSP, call setup, and call release in the preferred embodiment of the present invention.

FIG. 8 is a message flow diagram illustrating the flow of messages utilized for the retrieval of an enhanced subscriber service from the ViSSP 40, call setup, and call release in the preferred embodiment of the present invention. At 81, the LS 31a serving the calling subscriber 16a seizes an MF trunk to the SSP/T 32a. At 82, the SSP/T sends an IAM to the ViSSP 40 which translates the message into an IAM (Call Forward) message and sends it to the SSP/T 32b serving the called subscriber at 83. At 84, the IAM (Call Forward) is sent to the LS 31b serving the called subscriber. At 85, an Address Complete Message (ACM) is sent from the LS 31b to the SSP/T 32b where it is forwarded to the ViSSP 40 at 86. The ViSSP forwards the ACM to the SSP/T 32a at 87. At 88, an Answer message (ANM) is sent from the LS 31b to the SSP/T 32b where it is forwarded to the ViSSP 40 at 89. The ViSSP forwards the ANM to the SSP/T 32a at 91. At 92, the answer is sent over the MF trunk to the LS 31a.

When the first subscriber hangs up (in this example, subscriber 16a), a release signal is sent over the MF trunk from the LS 31a to the SSP/T 32a at 93. A release message (REL) is sent at 94 to the ViSSP 40 which forwards the REL at 95 to the SSP/T 32b serving the other subscriber. At 96, the SSP/T 32b sends a REL to the LS 31b serving the other subscriber. The LS 31b sends a release complete message (RLC) to the SSP/T 32b at 97 which forwards the RLC to the ViSSP 40 at 98. At 99, the ViSSP 40 forwards the RLC to the SSP/T 32a serving the first subscriber to hang up, directing that the MF voice link be disconnected. At 101, the voice link is disconnected.

A limitation with the ViSSP solution to providing enhanced subscriber services is that no voice circuits exist between the local switch 31 and the ViSSP 40; there is only the ISUP connection. Without voice circuit access, announcements representing information or instructions cannot be provided to subscribers, and subscribers cannot influence the processing of the call either by Dual Tone Multi-Frequency (DTMF) digits or voice control. This applies both to subscribers who are attempting to update their service profile, and to calling parties attempting to access a ViSSP Advanced Voice Services Subscriber (VAVSS) service, as described below.

Figure 9:
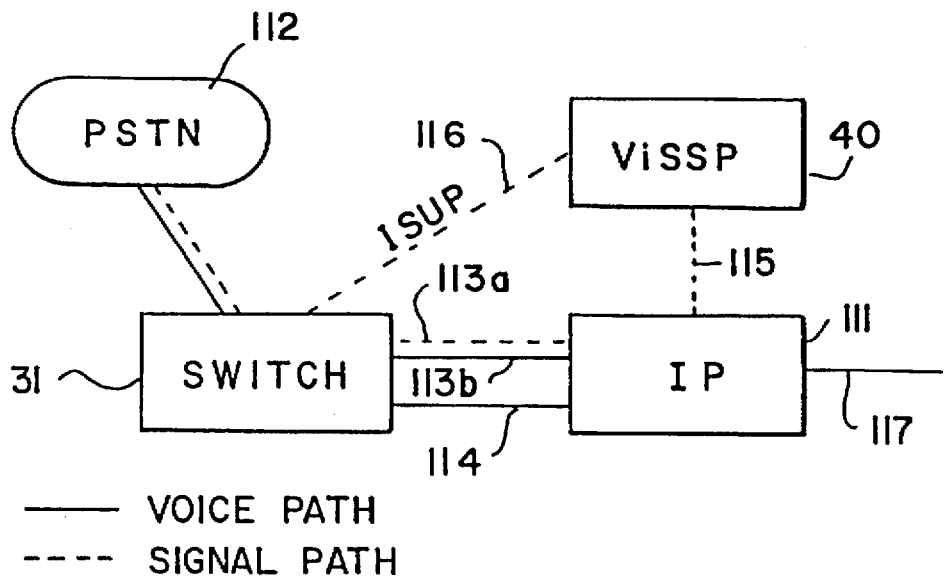
FIG. 9 is a high level block diagram illustrating the connection of an intelligent peripheral (IP) to a ViSSP and a switch connected to the public switched telephone network (PSTN) in accordance with the teachings of the present invention.

FIG. 9 is a high level block diagram illustrating the connection of an intelligent peripheral (IP) 111 to a ViSSP 40 and a switch 31 connected to the public switched telephone network (PSTN) 112 in accordance with the teachings of the present invention. The switch 31 may be either a Tandem or a Local Switch. If the switch is TCAP/AIN capable, a SCP can replace the ViSSP for service storage and retrieval. If the switch 31 is not TCAP/AIN capable, but has ISUP capability, then a ViSSP 40 is required, and the switch 31 and ViSSP 40 communicate over an ISUP link 116. An IP circuit 113a and an IP voice path 113b connect the switch 31 and the IP 111. The IP circuit 113a may be a loop start, ground start, ISDN (BRI, PRI), T1, etc. In addition, a Simplified Message Desk interface (SMDI) interface 114 between the switch 31 and the IP 111 provides the calling party number (A number) for those types of connections that do not provide it. A signal connection 115 between the ViSSP 40 and the IP 111 may be Ethernet, SS7 based, GR 1129, or CS1 type messages. interface 117 connects the IP 111 to other computers, and may be, for example, interfaces to a local area network (LAN) or direct TTY type such as to a VT100. By connecting the IP 111 into the AIN 12 in this manner, the IP provides subscribers with a variety of advanced voice services. Such services include, but are not limited to voice activated dialing, subscriber modification of a service profile by voice or DTMF digits, single number access to a subscriber that searches for a VAVSS in a defined hunting order, and E-mail access.

Figure 10:
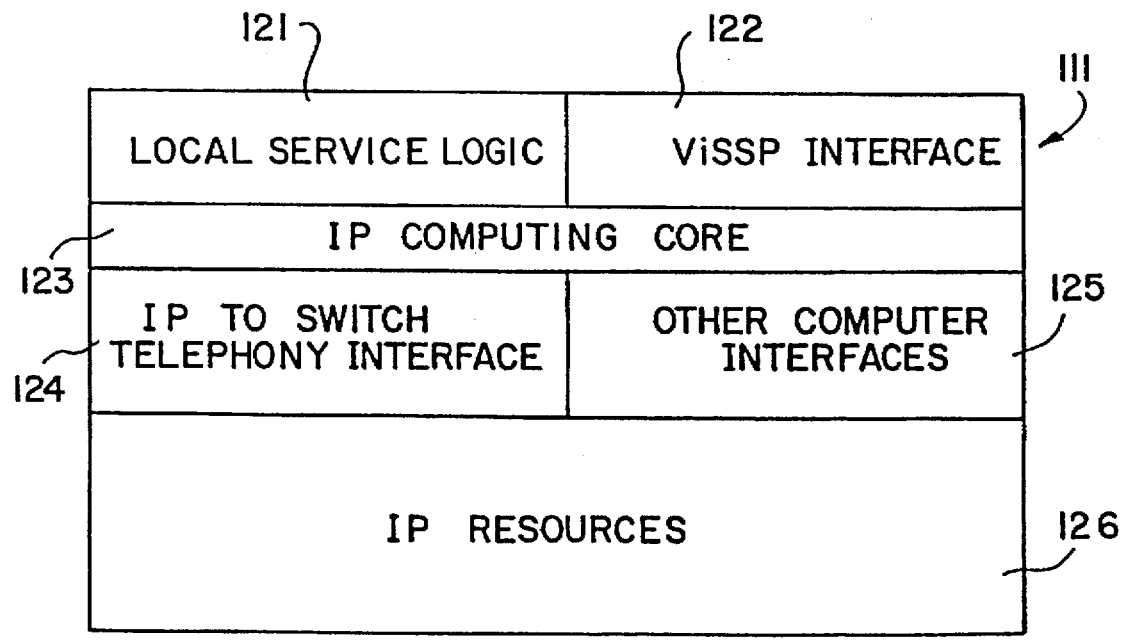
FIG. 10 is a functional block diagram of an intelligent peripheral (IP) constructed in accordance with the teachings of the present invention.

FIG. 10 is a functional block diagram of an intelligent peripheral (IP) 111 constructed in accordance with the teachings of the present invention. At one level, the IP 111 includes local service logic 121 and a ViSSP interface 122. The next level is the IP computing core 123 which may comprise a processor and memory. The next level includes an IP-to-Switch telephony interface 124 which may be ISDN BRI or PRI, T1, Loop Start, or Ground Start. Other computer interfaces 125 are also provided such as interfaces to a local area network (LAN) or direct TTY type such as to a VT100. A final level comprises IP resources 126 and may include a tone generation plant, a digital signal processor, voice processing (generation and recognition), conference circuits, tone receiver, and tone discriminator (busy, reorder, etc.).

Figure 11:
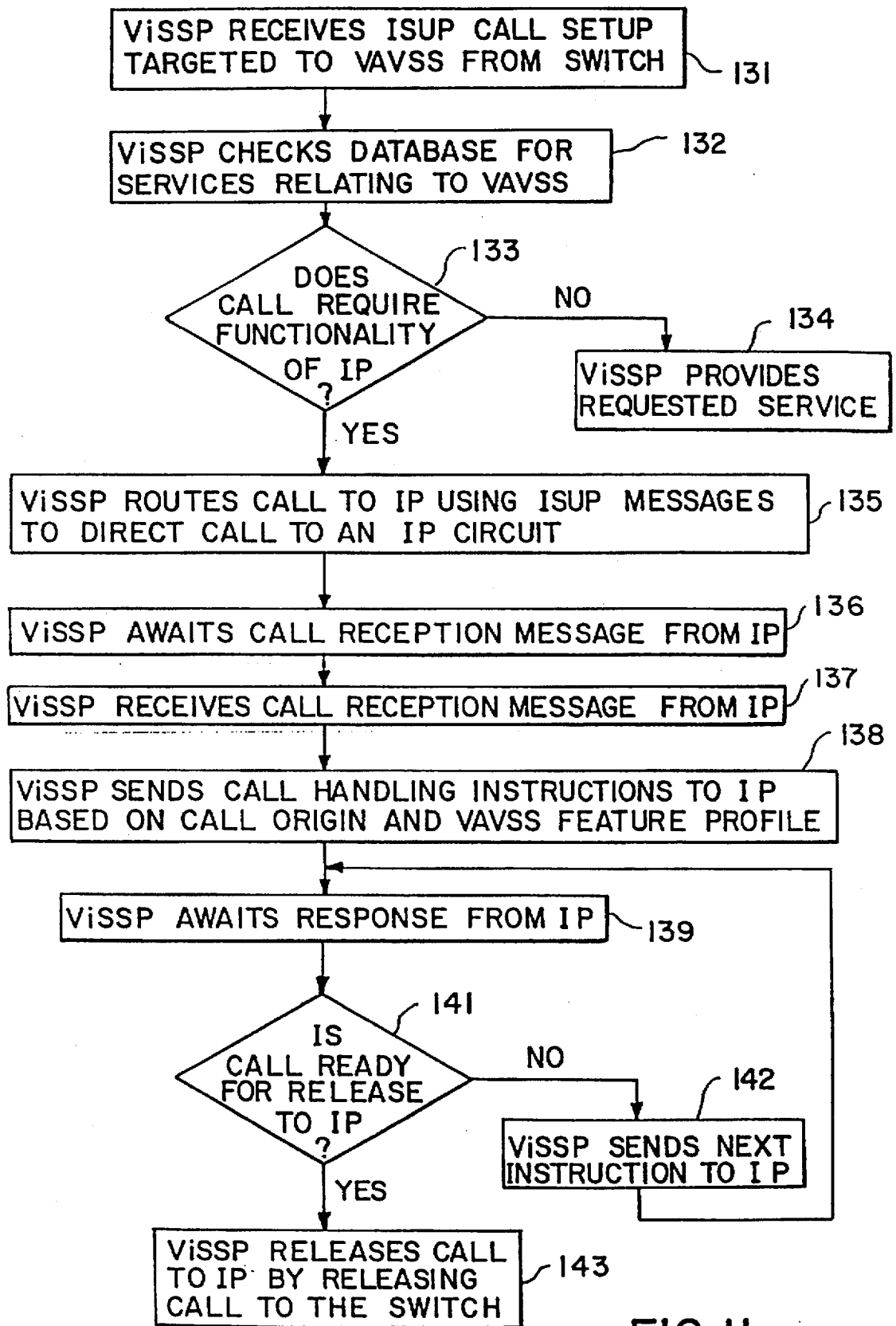
FIG. 11 is a flow chart of the process carried out in the IP of the present invention when interacting with a ViSSP to provide an advanced subscriber service to a ViSSP advanced voice services subscriber (VAVSS)

FIG. 11 is a flow chart of the process carried out in the ViSSP 40 when interacting with the IP 111 of the present invention to provide an advanced subscriber service to a ViSSP advanced voice services subscriber (VAVSS). At step 131, the ViSSP 40 receives an ISUP call setup message via the switch 31. Calls to the ViSSP are routed to the ViSSP only if the called number (B number) reflects a target ViSSP subscriber. The ViSSP target subscriber is referred to as the ViSSP Advanced Voice Services Subscriber (VAVSS). At step 132, the ViSSP 40 checks the ViSSP database for services relating to the VAVSS. At step 133, it is determined whether or not the call requires the functionality offered by the IP 111. If not, the ViSSP provides the requested service at 134.

If it is determined at step 133 that the call requires the functionality offered by the IP 111, then the ViSSP routes the call to the IP at step 135 using ISUP messages to direct the call to an IP circuit using a Network Address (B number) to identify the IP circuit. At 136, the ViSSP 40 awaits a call reception message from the IP 111 via signaling link 115. At 137 the call reception message is received by the ViSSP informing the ViSSP of a call termination on the IP 111. At step 138, the ViSSP determines and sends to the IP, appropriate call handling instructions. The instructions are based on the call origin (A number) and the VAVSS feature profile. Possible instructions may include, but are not limited to the following:

Play announcement and collect digits.
Translate voice to digits (speaker dependent and independent).
Transfer call utilizing call control procedures available on IP circuit 113a.
Invoke a three-way call utilizing call control procedures available on IP circuit 113a.
Originate associated call on IP circuit 113a to a specified network address.
Conference multiple calls on IP circuit 113a.
Release call on IP circuit 113a.
Check for facsimile (Fax) call.
Check for modem call.

At step 139, the ViSSP 40 awaits a response from the IP 111. Possible responses may include, but are not limited to the following:

General time-out.
Fax call detected.
Modem call detected.
DTMF digits.
Voice digits.
Busy or other network call non-completion tone detected on call origination.
No answer time-out.

At step 141, the ViSSP 40 determines whether or not the call is ready for release to the IP 111. This determination is based on the IP response received and the VAVSS profile. If it is determined that the call is not ready for release to the IP, then the ViSSP sends the next instruction to the IP at 142. If, however, it is determined that the call is ready for release to the IP, then the ViSSP releases the call to the IP by releasing the call originated to the switch 31 via the switch-to-ViSSP ISUP link 116.

Figure 12:
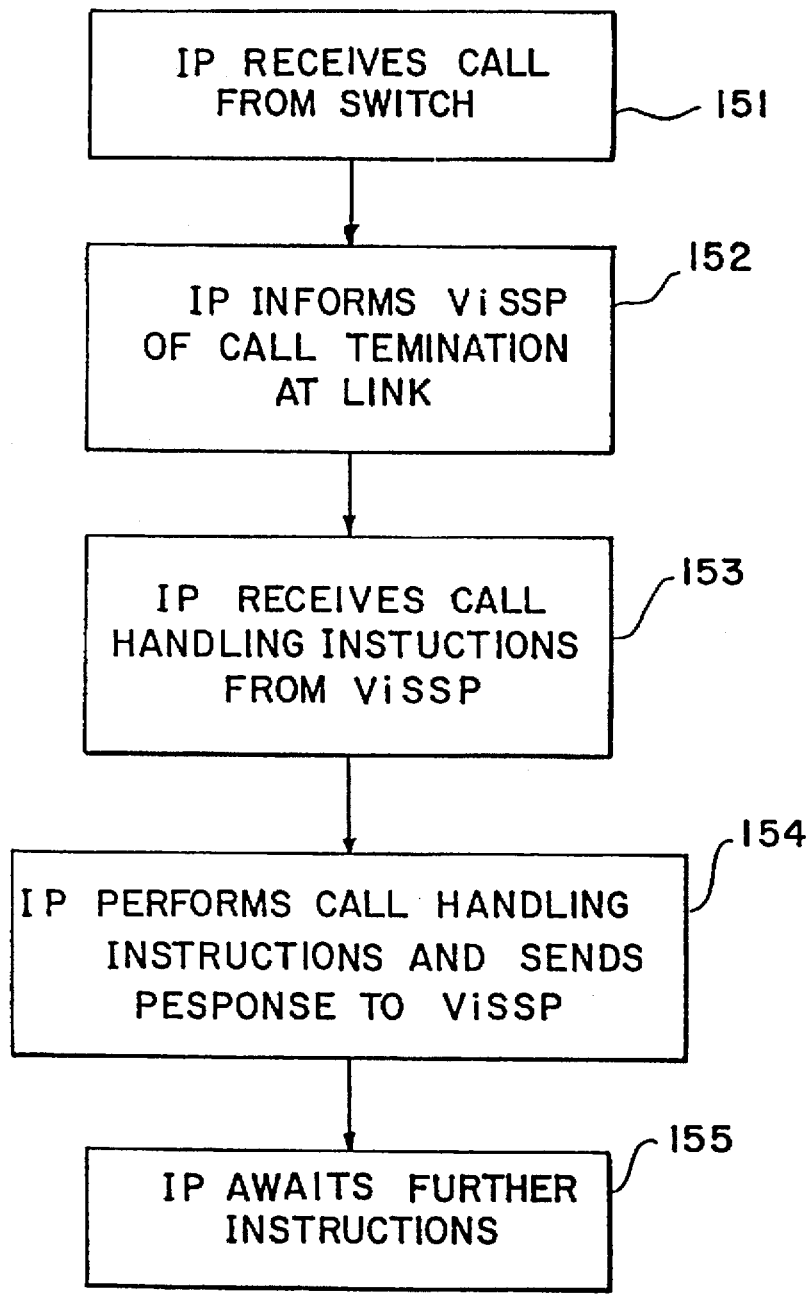
FIG. 12 is a flow chart of the process carried out in the ViSSP when interacting with the IP of the present invention to provide an advanced subscriber service to a ViSSP advanced voice services subscriber (VAVSS).

FIG. 12 is a flow chart of the process carried out in the IP 111 of the present invention when interacting with the ViSSP 40 to provide an advanced subscriber service to a ViSSP advanced voice services subscriber (VAVSS). At step 151, a call is received at an IP circuit 113a. The call may be direct dialed or may be routed to the IP 111 via the ViSSP 40 using ISUP signaling over link 116. At 152, the IP informs the ViSSP of the call termination at the IP circuit 113a via the direct IP-to-ViSSP signaling link 115. At 153, the IP receives call handling instructions from the ViSSP via link 116. Some of the potential call handling instructions are delineated in the discussion of FIG. 11 above.

At step 154, the IP 111 performs the call handling instructions which were received from the ViSSP 40, and provides processed voice and/or DTMF digits to the switch 31 when the call is released to the IP by the ViSSP. The IP then sends a response to the ViSSP. Some of the potential responses are delineated in the discussion of FIG. 11 above. The IP then awaits further instructions at step 155.

Connection to a Service Control Point (SCP)

The intelligent peripheral (IP) 111 of the present invention may also be connected to a service control point (SCP) 19 (FIG. 1). In this embodiment, the connection between the IP 111 and the SCP 19 may be a protocol based on the European Telecommunications Standards institute (ETSI) CS1 protocol.

As noted above, the SCP 19 performs service activation functions which include database storage of enhanced subscriber services, and retrieval of services through the use of software modules known as Service Independent Building Blocks (SIBs). Service Script interpreter (SSI) software is utilized to combine various SIBs into service scripts which define and implement enhanced subscriber services. The LS 31 must be upgraded with the TCAP/AIN communications protocol to access the SCP 19.

While the TCAP/AIN protocol provides the SCP with a means for requesting announcements or digit collection, the services that can be provided are limited by the resources of the switch. Many existing switches do not provide the digital signal processing resources required for services such as voice activated dialing (VAD).

Voice traffic is carried from the switch 31 to the IP 111 by two trunks. A first trunk utilizes SS7 SUP signaling. A second trunk may utilize any trunk interface supported by the switch and the IP, as long as automatic number identification (ANI) is provided over the interface. Data is carried from the IP 111 to the SCP 19 over an SS7 signaling link using TCAP/AIN.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for providing advanced subscriber services to telecommunications subscribers, said system comprising:

a switch connected to said telecommunications subscribers and incapable of communicating using a Transaction Capabilities Application Part (TCAP) message;

a virtual service switching point (ViSSP) containing service logic and subscriber data for providing said advanced subscriber services;

a first signaling link comprising an Integrated Services Digital Network (ISDN) User Part (ISUP) connection for connecting said switch and said ViSSP;

an intelligent peripheral (IP) operable to process voice or dual tone multi-frequency digit information, said IP including a voice circuit assigned a dialable directory number;

a second signaling link connecting said ViSSP with said IP;

a third signaling link connecting said IP with said switch;

a voice link connecting said voice circuit of said IP with said switch;

means within said ViSSP for establishing a call connection with said IP voice circuit over said voice link by transmitting an ISUP signal over said first signaling link using said dialable directory number as a called party number and for instructing said IP to collect from said switch over said voice link, analyze and report back to the ViSSP over said second signaling link on, subscriber voice or dual tone multi-frequency (DTMF) digit information; and means within said ViSSP for effectuating an advanced subscriber service in response to said collected, analyzed and reported voice or DTMF digit information.

2. The system for providing advanced subscriber services to telecommunications subscribers of claim 1 wherein said first signaling link comprises a Common Channel Signaling (CCS) link employing a Signaling System Number 7 (SS7) signaling protocol.

3. The system for providing advanced services subscriber to telecommunications subscribers of claim 1 wherein said third signaling link employs a Simplified Message Desk Interface (SMDI).

4. The system for providing advanced subscriber services to telecommunications subscribers of claim 1 wherein said second signaling link comprises an Ethernet connection.

5. A method of providing advanced subscriber services to telecommunications subscribers, said method comprising the steps of:

connecting a switch to said telecommunications subscribers wherein said switch is incapable of communicating a Transaction Capabilities Application Part (TCAP) message;

connecting a virtual service switching point (ViSSP) of subscriber services to said switch via a first signaling link comprising an Integrated Services Digital Network (ISDN) User Part (ISUP) connection;

connecting an intelligent peripheral to said ViSSP via a second signaling link, said intelligent peripheral including a voice circuit assigned a dialable directory number;

connecting said intelligent peripheral to said switch via third signaling link;

connecting said voice circuit of said intelligent peripheral to said switch via a voice link transmitting an Integrated Service Digital Network User Part (ISUP) signal over said first signaling link using said dialable directory number as a called party number from said ViSSP;

instructing said intelligent peripheral to collect from said switch over said voice link, analyze and report back to the ViSSP over said second signaling link on, subscriber voice or dual tone multi-frequency (DTMF) digit information; and effectuating an advanced subscriber service in response to said collected, analyzed and reported subscriber voice or DTMF digit information by said ViSSP.

6. The method of providing advanced subscriber services to telecommunications subscribers of claim 5 wherein said first signaling link comprises a Common Channel Signaling (CCS) link employing a Signaling System Number (SS7) signaling protocol.

7. The method of providing advanced subscriber services to telecommunications subscribers of claim 5 wherein said step of connecting said intelligent peripheral to said switch via said third signaling link includes connecting said intelligent peripheral to said switch with a Simplified Message Desk interface (SMDI).

8. The method of providing advanced subscriber services to telecommunications subscribers of claim 5 wherein said second signaling link comprises an Ethernet connection.

9. A system for providing advanced subscriber services to subscribers comprising:

an exchange connected to said subscribers and incapable of handling a Transaction Capabilities Application Part (TCAP) message;

a virtual service switching point (ViSSP) for said advanced subscriber services;

a first signaling link comprising an Integrated Services Digital Network (ISDN) User Part (ISUP) connection for connecting said exchange with said ViSSP;

an intelligent peripheral (IP) operable to process voice or dual tone multi-frequency digit information, said IP including a voice circuit assigned a dialable directory number;

a second signaling link connecting said ViSSP with said IP;

a third signaling link connecting said IP with said exchange;

a voice link connecting said voice circuit of said IP with said exchange; and means within said ViSSP for:
      establishing a call connection between said exchange and said voice circuit of said IP over said voice link by transmitting an Integrated Service Digital Network User Part (ISUP) signal over said first signaling link using said dialable directory number as a called party number;
      instructing said IP to collect from said exchange over the voice links process and report back to the ViSSP over the second signaling link on, subscriber voice or dual tone multi-frequency digit information; and processing the IP collected, processed and reported on subscriber voice or dual tone multi-frequency digit information to identify an advanced subscriber service to be effectuated by the system.

10. The system of claim 9 wherein the second signaling link comprises a packet-data communication link.

11. The system of claim 9 wherein the first signaling link is an Integrated Services Digital Network (ISDN) User Part (ISUP) Link.

12. The system as in claim 9 wherein the IP further comprises means for providing said advanced subscriber service to said subscribers in response to the instructing by the ViSSP.

13. The system as in claim 9 wherein the advanced subscriber service to be effectuated by the system is effectuated by the exchange.

14. The system of claim 9 wherein said third signaling link employs a Simplified Message Desk Interface (SMDI).

15. The system of claim 10 wherein said second signaling link comprises an Ethernet connection.

* * * * *